C. V. KERR.
FLEXIBLE SHAFT COUPLING.
APPLICATION FILED OCT. 12, 1910.
1,073,690.
Patented Sept. 23, 1913.
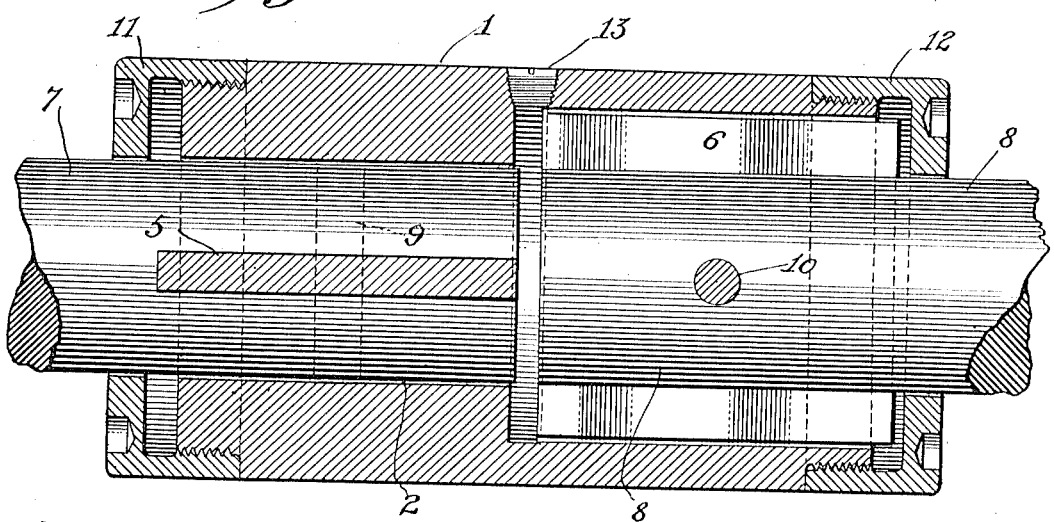
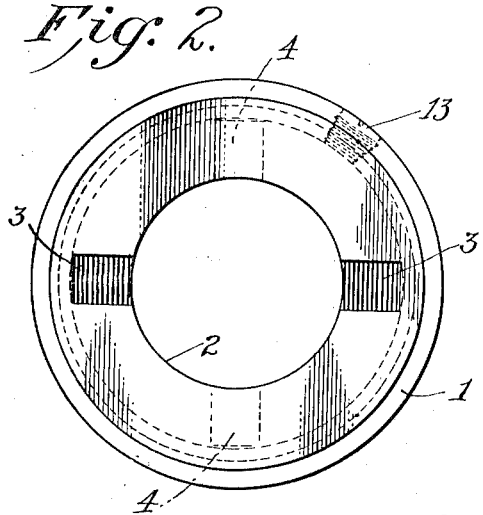
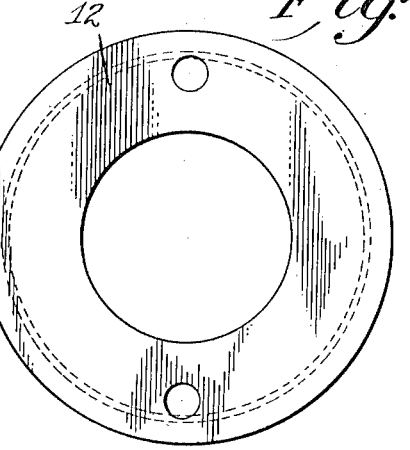
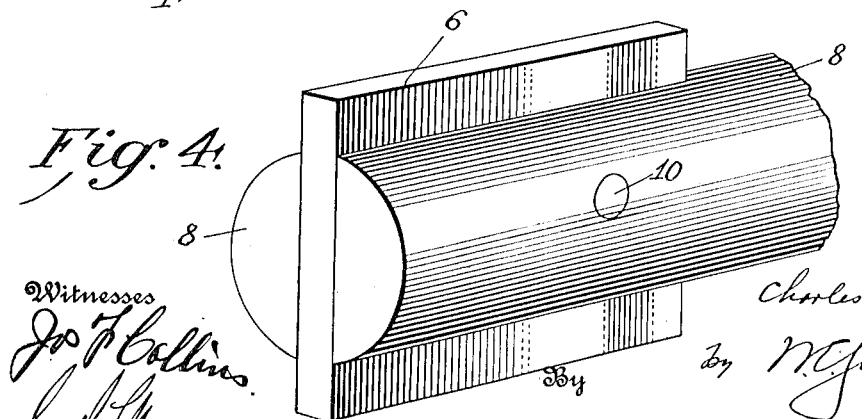
Witnesses
Inventor
Charles V. Kerr,
By
Attorney

UNITED STATES PATENT OFFICE.

CHARLES V. KERR, OF WELLSVILLE, NEW YORK.

FLEXIBLE SHAFT-COUPLING.

1,073,690.  Specification of Letters Patent.  Patented Sept. 23, 1913.

Application filed October 12, 1910. Serial No. 586,629.

*To all whom it may concern:*

Be it known that I, CHARLES V. KERR, a citizen of the United States, residing at Wellsville, in the county of Allegany and State of New York, have invented certain new and useful Improvements in Flexible Shaft-Couplings, of which the following is a specification.

My invention relates to a flexible coupling for shafts which is particularly adapted for high speed work, and the object of my invention is to construct and arrange the parts of the coupling, so that owing to the changes or inaccuracies in alinement, variations of temperature in one or both machines connected by the coupling, the efficiency of the shafting will not be altered or destroyed.

A further object of my invention is to construct a flexible coupling, which will have all the functions above indicated and at the same time will consist of the least number of parts, be inexpensive to manufacture, easily assembled, or taken apart, and require the minimum of repairs.

The invention consists of structural features and relative arrangement of elements which will be hereinafter more fully described and particularly pointed out in the appended claims.

Referring to the drawings in which similar reference characters indicate the same parts in the several figures of the drawing; Figure 1, is a longitudinal sectional view of my improvement in flexible coupling; Fig. 2, is an end view of the coupling body with the shaft and caps removed; Fig. 3, is a view of one of the coupling caps; and Fig. 4, is an isometric and end view of one of the ends of the shaft with the coupling key attached.

In the drawings 1, represents the body of the coupling which is provided with a central bore 2, slightly larger than the shaft to be coupled.

3, 3, and 4, 4, are two pairs of slots or key-ways at right angles to each other and are adapted to receive the tempered steel keys 5, and 6, said keys 5, and 6, being secured in slots at the ends of the shafts 7, 8, by means of pins 9 and 10, respectively. The purpose of arranging the keys at right angles to each other is to permit a slight oscillating motion and the keys sliding in the slots provide for an endwise motion of the shafts 7 and 8. Coupling caps 11, and 12, are screwed on the ends of the body 1, to limit the endwise motion of the shafts 7, and 8, and also form suitable reservoirs within, and at the ends of the body for a lubricant such as graphite or oil, or a mixture of the two, which insures the greater flexibility of the coupling and increases the life of the parts. It will be seen from this construction, that the high speed of rotation forces the lubricant against the upper sides of the inner walls of the caps 11, and 12, and no leakage of the lubricant can take place between the shaft ends 7 and 8, and said caps.

13 is a slotted screw plug closing an opening at the center of the coupling body for the purpose of inserting a suitable lubricant, or cleaning out the space between the inner ends of the shafts 7 and 8.

From the foregoing simple and easily separable construction, it will be readily understood, that the parts comprising the flexible coupling can be cheaply, and accurately machined out of steel or other material or combination of said materials, thereby insuring a maximum of strength, and at the same time enabling one to quickly make any repairs, or inspect the working parts.

The operation of the invention is as follows: The parts having been assembled as shown in Fig. 1, the shaft section 8 being rapidly rotated, it will transmit its motion by the intermediate parts or pin 10, key 6, slot 4, body 1, key 5, slot 3, and pin 9, to the shaft section 7, and owing to the keys 5 and 6, having longitudinal play in the slots 3 and 4, said shaft sections 7 and 8 may approach or recede from each other due to expansion or contraction, or other causes, and hence prevent buckling, or improper alinement of the shafts. This construction will also permit the shaft sections 7 and 8 to have a slight oscillatory movement independent of each other and hence avoid any damages to the shaft bearings or hangers, or shaft, when under rapid rotation. The lubricant in the end and central pockets will be uniformly supplied in the bore, and key ways, and insure constant lubrication of the necessary surfaces.

What I claim as new and desire to secure by Letters Patent is as follows:—

1. A flexible shaft coupling comprising a body portion or casing having a central bore and a pair of internal slots or key ways diametrically opposite each other at each end of the body portion, the slots or key ways at one end being at right angles to those of the other end, a key sliding in each pair of slots and having slight lateral motion, an independent shaft section loosely fitting in each end and slightly smaller than the bore of the body portion and connected with the key at the same end and separated from and having movement independent of the other shaft section, and caps attached to the ends of the body portion to retain the keys and shaft sections in said body portion.

2. A flexible shaft coupling comprising a body portion having a central bore and a pair of internal slots or keyways diametrically opposite each other at each end of said body portion, said pairs of slots being at right angles to each other; a shaft inserted in each end of the body portion, the central bore being slightly larger in diameter than the shaft; a through key secured in the end of each shaft and the ends of each key inserted in a pair of said slots; and caps attached to the ends of the body portion to form a reservoir for lubricant and to limit the endwise movement of said shafts.

In testimony whereof I affix my signature in presence of two witnesses.

CHARLES V. KERR.

Witnesses:
W. H. SACKETT,
WM. SADEWASSER.